United States Patent [19]
Verschage et al.

[11] 3,756,443
[45] Sept. 4, 1973

[54] FOLDING GOOSENECK TRAILER

[75] Inventors: Richard A. Verschage, Cedar Rapids, Iowa; Donald L. Kearby; Carl H. Wilson, both of Kewanee, Ill.; Thomas R. Hazel, Milwaukie, Oreg.

[73] Assignee: Hyster Company, Portland, Oreg.

[22] Filed: June 2, 1972

[21] Appl. No.: 259,223

[52] U.S. Cl. .............................. 214/506, 280/423 B
[51] Int. Cl. ............................................. B60p 1/04
[58] Field of Search ................ 214/505, 506, 423 B, 214/425 A

[56] References Cited
UNITED STATES PATENTS
3,419,169  12/1968  James ................................. 214/506

FOREIGN PATENTS OR APPLICATIONS
401,426  3/1968  Australia ........................ 280/423 B

*Primary Examiner*—Albert J. Makay
*Attorney*—Francis Swanson

[57] ABSTRACT

An industrial trailer having a collapsible gooseneck is disclosed. A loadbed of the trailer is raised or lowered by main hydraulic cylinders. Secondary hydraulic cylinders operate the gooseneck.

8 Claims, 9 Drawing Figures

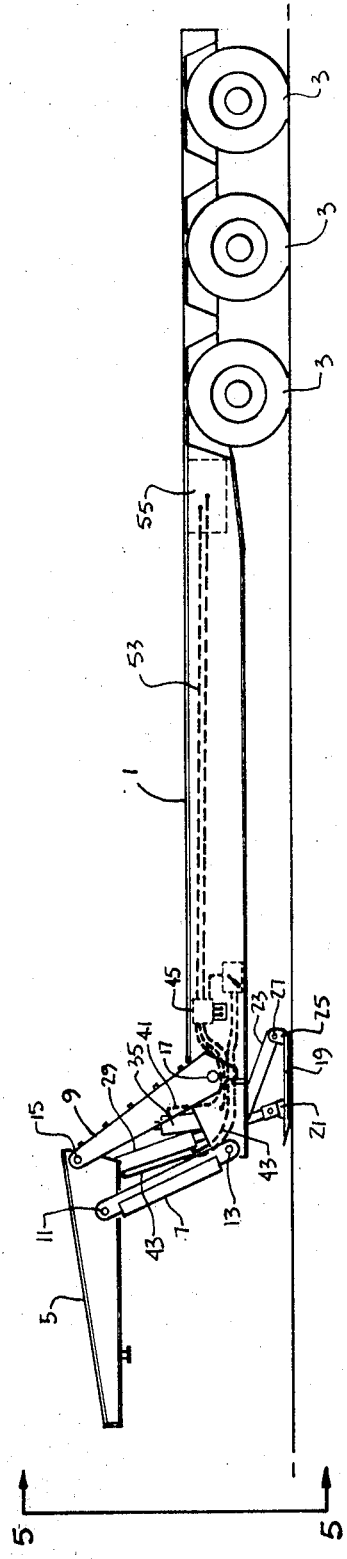
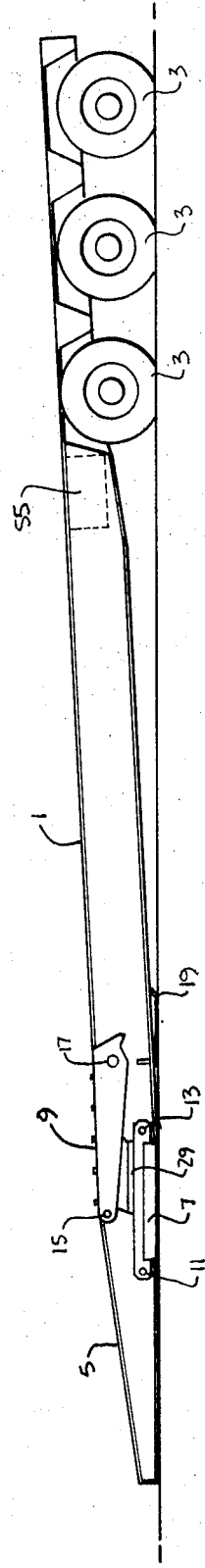

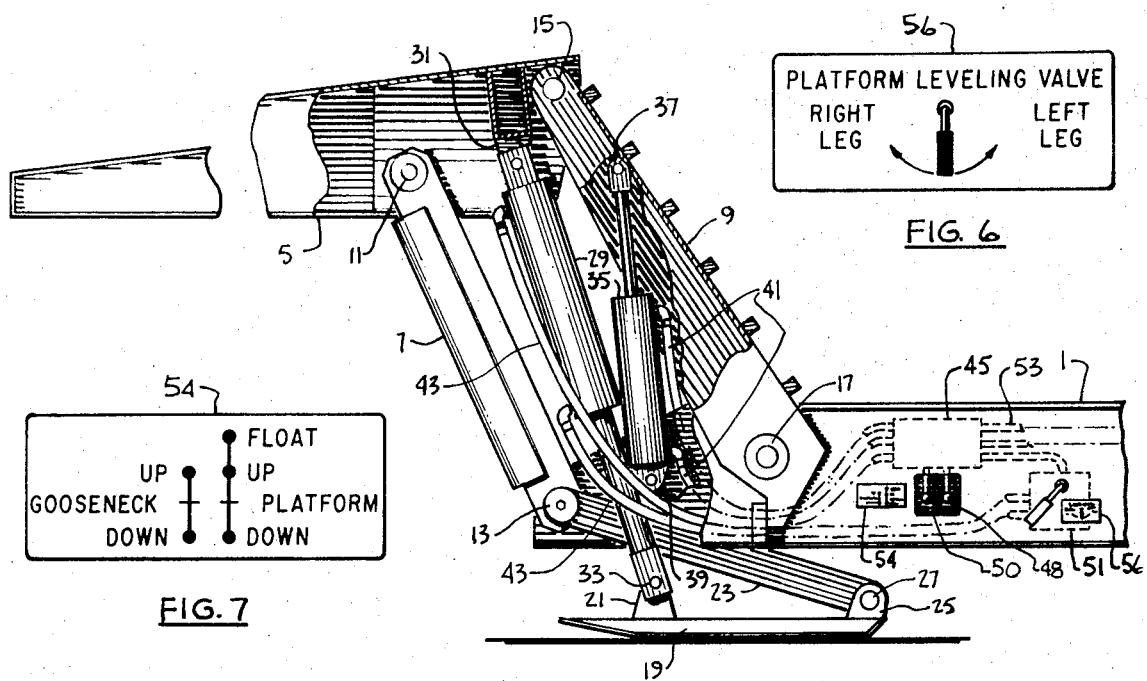
FIG. 6
FIG. 7
FIG. 3A
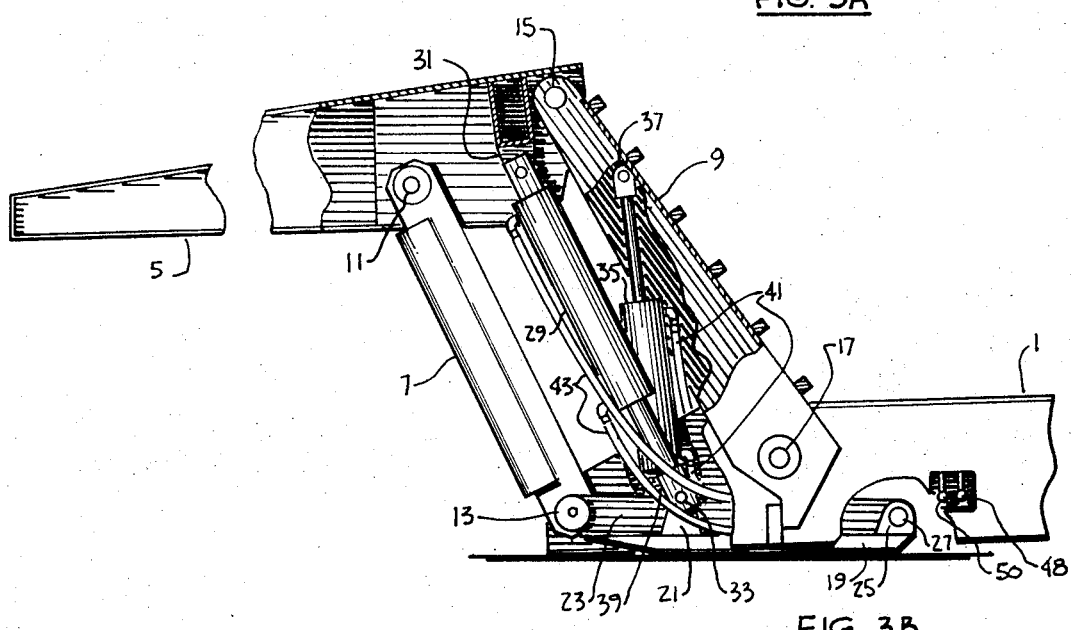
FIG. 3B
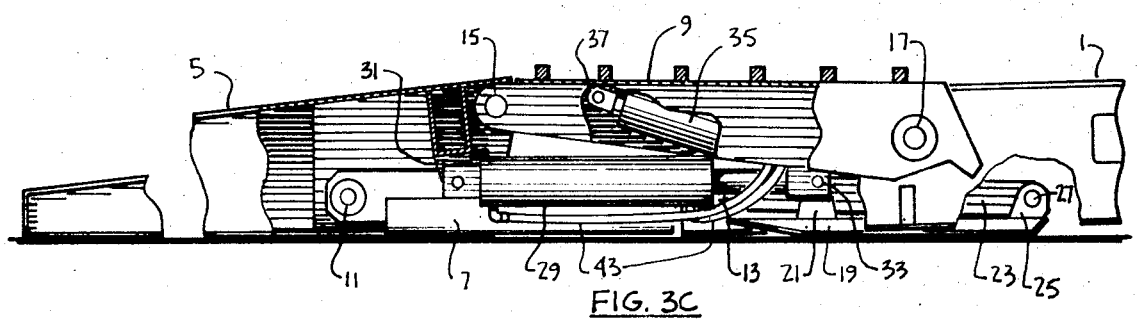
FIG. 3C

FOLDING GOOSENECK TRAILER

BACKGROUND OF THE INVENTION

1. Field of the Invention

The present invention relates to heavy duty industrial trailers and more particularly to those which have collapsible goosenecks to facilitate loading and unloading.

2. Description of the Prior Art

Conventional heavy duty industrial trailers usually consist of a low bed with multiple wheels at the rear, and a fixed gooseneck at the front which engages the fifth wheel of a tractor. To facilitate easy loading, trailers with folding goosenecks have been developed. These are either mechanical or fluid operated. Mechanical versions usually employ cables to lift the gooseneck. A typical illustration is disclosed in U.S. Pat. No. 2,605,916 to Martin. A hydraulic version is shown in U.S. Pat. 2,441,710 to Martin.

Mechanical versions are generally slow and require a winch and cable or similar device mounted on the tractor. Hydraulic versions generally comprise a retractable pedestal to hold the platform level with the ground. The gooseneck folds down to form an inclined ramp to load the horizontal bed. These trailers are often difficult to load or unload on sloping or uneven ground. The folded gooseneck often presents a steep ramp which must be negotiated when loading. Locking pins must be used to keep the gooseneck upright as the tractor tows the trailer.

SUMMARY OF THE INVENTION

The present invention overcomes the above problems by providing a bed which may be lowered to the ground and lies flat. The trailer has a plurality of ground engaging pads, each of which is independently adjustable. These allow the bed to be adjusted on uneven terrain. A hydraulic system for operating the gooseneck independently of the bed is provided within the trailer.

The primary objects of the invention are to provide:
1. A trailer wherein the load supporting bed may be hydraulically lowered to the ground and adjusted to compensate for rough or sloping surfaces.
2. A folding gooseneck which may be operated completely independent of the bed supporting means and which will lie flat on the ground.
3. A folding gooseneck which eliminates the need for locking pins to keep it in the erect position.

A BRIEF DESCRIPTION OF THE DRAWINGS

Other objects and advantages relating to the invention will become evident from the following detailed description which proceeds with reference to the drawings wherein:

FIG. 1 shows a trailer equipped with the invention, detached from the tractor and with the gooseneck erected and the ground support pads lowered.

FIG. 2 shows the gooseneck lowered and the trailer ready for loading or unloading.

Figure 5:
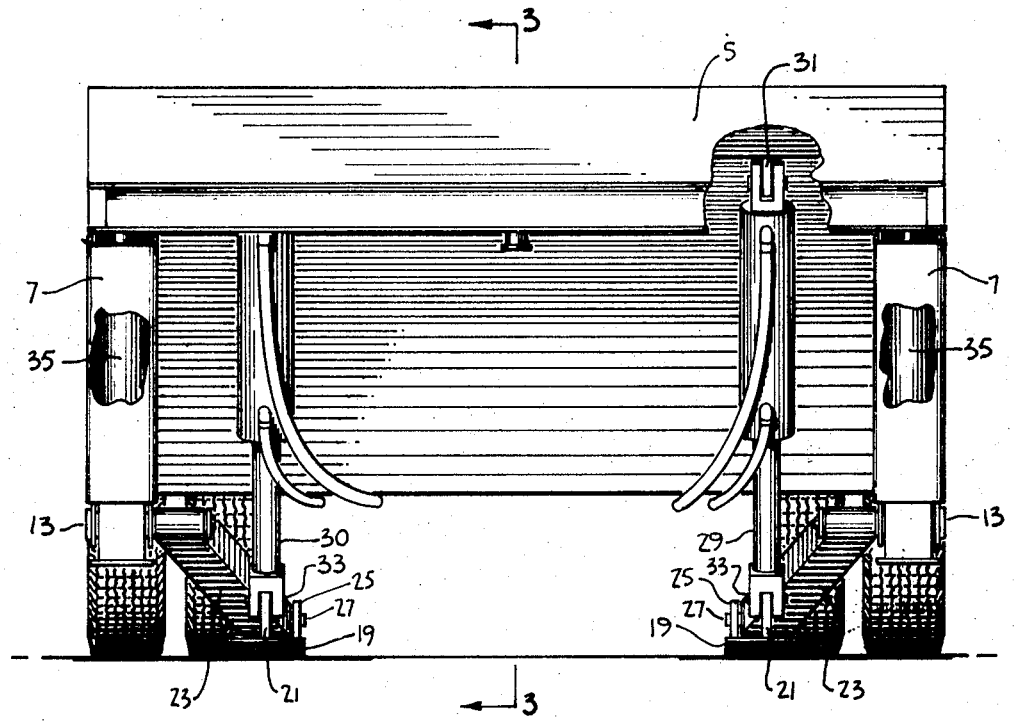

FIGS. 3a, 3b, and 3c are taken along line 3—3 of FIG. 5.

FIG. 3a is an elevational view, partially broken away, showing the arrangement of the gooseneck members and associated fluid cylinders.

FIG. 3b shows the bed lowered to the ground, but the gooseneck still erect. The figure is broken away to show the cylinder relation.

FIG. 3c shows the relation of the gooseneck and cylinders when the gooseneck is collapsed.

Figure 4:
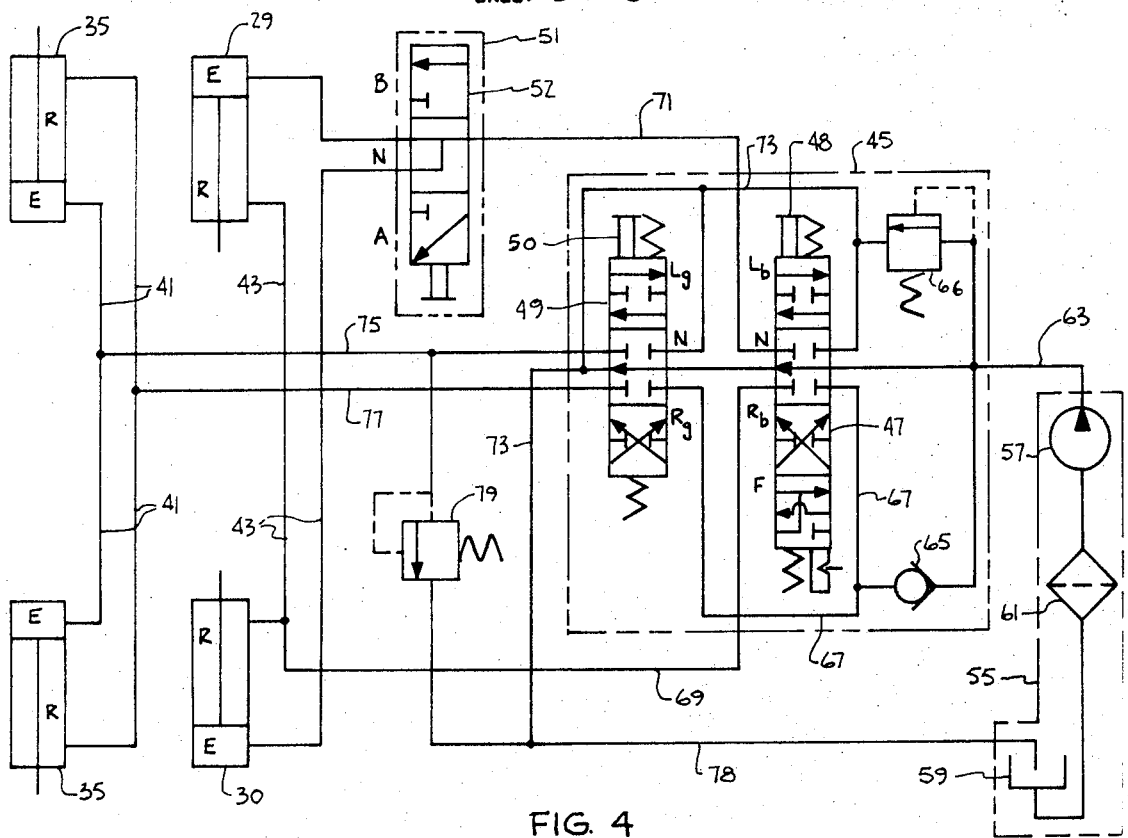

FIG. 4 shows the schematic of the fluid system of the trailer.

FIG. 5 is taken along line 5—5 of FIG. 1 and is a front view of the trailer with the pads down and the gooseneck erect.

FIG. 6 shows the operating instruction plate for the bed leveling control valve.

FIG. 7 shows the operating instruction plate for the gooseneck and bed control valve.

The trailer as illustrated in FIG. 1 consists of a load support platform, hereafter referred to as the bed 1 having a plurality of wheeled axles 3 at its rear and a folding gooseneck at its forward end. The gooseneck comprises a horizontal hitch platform 5, a pair of tension links 7 and a compression link 9. The compression link 9 when in a collapsed position also forms a part of the loading and unloading surface. The tension links 7 are pivotably attached to the hitch platform 5 by link pins 11 and to the forward end of the bed by link pins 13. The compression link is likewise pivotably connected to the hitch platform with link pins 15 and to the bed by link pins 17. A pair of ground engaging pads 19 each having a cylinder mounting plate 21 along its longitudinal center line are operatively connected to the forward end of bed 1 by a pair of pad links 23. The pad links 23 are pivotably connected at one end to bed 1 by pin links 13. Each pad 19 has a pair of vertically disposed plates 25 at its rear adapted to receive the other end of pad links 23 which is pivotably attached to the plates 25 by pin 27. A pair of hydraulic bed-lifting cylinders 29 and 30 are pivotably connected first to a pair of ears 31 mounted on the hitch platform 5 forwardly of link pin 15 and secondly to pads 19 at plate 21 with pins 33. A pair of gooseneck lifting and lowering cylinders 35 are interposed between the bed 1 and the compression link 9. The upper ends of the gooseneck cylinders 35 are pivotally attached to ears 37 on compression link 9. The lower ends of cylinders 35 are pivotally connected to the ears 39 near the forward end of bed 1. Gooseneck cylinder hydraulic hoses 41 and bed cylinder hoses 43 are operatively connected to a control valve 45 mounted on bed 1. This is a conventional spool valve having two spools operated by two levers. The first spool 47 controls the bed lifting and lowering cylinders 29 and 30. Its control lever 48 has four positions: bed-up, bed-down, neutral and float. A second spool 49 controls the gooseneck cylinders. Its control lever 50 has three positions: up, down, neutral. The gooseneck can not be raised or lowered with the bed cylinders 29 and 30. A bed adjusting valve 51 containing spool 52 is connected to valve 45 and will selectively activate either bed cylinder 29 or 30 to compensate for sloping or uneven terrain. Valves 45 and 51 together with the trailer hydraulic circuit will be discussed in greater detail below. The valves 45 and 51 are connected via hoses 53 to a power pack 55 for providing hydraulic pressure and flow mounted within the bed 1 of the trailer. The pack is of conventional design, the details of which form no part of this application. Inlieu of a self-contained power source hydraulic fluid or air to operate the gooseneck may be supplied from the tractor (not shown).

The operative relationship of the gooseneck parts and hydraulic system of the trailer can best be understood with reference to FIG. 4 of the drawings. While the schematic illustrated is hydraulic, it is clear that air or a combination of air and hydraulics could be satisfactorily used.

The pump 57 draws oil from the sump 59 through filter 61 and sends it to valve 45 via line 63. With valve spools 47 and 49 in the neutral position "N" the oil passes "over center" and returns to sump 59. When bed control spool 47 is in the $L_b$ position line 63 is blocked and the oil forces open check valve 65 contained within the body of valve 45. A manually adjustable pressure relief valve 66 is also contained within the body of valve 45. The oil passes into line 67, through spool 47 into line 69 and is routed to the retract side "R" of bed cylinders 29 and 30. This lowers the bed to the ground. The oil exhausted from side "E" of cylinders 29 and 30 passes through valve 51 into line 71 and is routed by spool 47 through line 73 to line 78 where it returns to sump 59.

When spool 47 is in the $R_b$ position, oil passes from line 67 into line 71, through valve 51 to the extend side E of bed cylinders 29 and 30. This raises the bed. Exhausted oil from side R of bed cylinder 29 and 30 enters line 43 and is directed by spool 47 into line 73 to line 78 where it returns to sump 59.

The bed 1 may be adjusted relative to the ground with valve 51. With spool 47 of valve 45 in the $R_b$ position, shifting spool 52 of valve 51 to position "A" directs oil to side E of cylinder 30 causing it to extend and raise the bed on one side relative to cylinder 29. Placing spool 52 of valve 51 into position B acts in the same manner on cylinder 29. In either position A or B exhausted oil passes through line 69, is routed by spool 47 into line 73 and from there to sump 59 through line 78. With spool 52 of valve 51 in the center position the bed cylinders 29 and 20 will extend simultaneously to raise the bed 1.

When the spool 47 of valve 45 is in the "F" position pressurized oil from the pump 57 is allowed to pass over center and return to sump 59 in a free circuit. Both E and R ends of bed cylinders 29 and 30 are routed to sump 59 to provide free travel of cylinders 29 and 30 when the bed 1 is resting on the ground. This feature allows the bed cylinders 29 and 30 to extend or retract freely when spool 49 is actuated and gooseneck cylinders 35 are extended or retracted.

The operation of the gooseneck is wholly independent of the bed 1 and is controlled by spool 49. With spool valve 49 in the $L_g$ position, oil is routed into line 77 to the retract side R of the gooseneck cylinders 35. This causes the gooseneck to fold down and form a ramp over which heavy equipment or other loads may be conveniently placed on bed 1. Exhausted oil from cylinders 35 passes through spool 49 into line 78 and on to sump 59. Relief valve 79 is placed in system to protect cylinders from over-pressurizing when spool 49 is in neutral position and provides a return to sump 59 through line 78.

With spool 49 in the $R_g$ position, oil is routed into lines 75 to the gooseneck cylinders 35 on the extend side E which causes the gooseneck to move into the upright position used for towing. When the gooseneck is erect and the trailer ready to be moved, gooseneck cylinders 35 are extended and spools 47 and 49 are in neutral position N. Line 75 is thus blocked and the gooseneck is held firmly upright by the pressurized cylinders 35 without the need for locking pins.

OPERATION

In operation the trailer is towed to the site of loading or unloading. The driver starts the power pack 55, then lowers the ground engaging pads 19 to the earth by positioning lever 48 in the bed-up position (spool 47 will be in the $R_b$ position). The trailer is now self supporting and the tractor may be disengaged from the trailer and driven away. After disengagement the lever 48 is moved to the bed-down position ($L_b$ position of spool valve 47), and the bed lowers to the ground with the gooseneck still raised. Lever 48 is now moved to the "float position." (Spool 47 in position F) and lever 50 is moved to the down position. This lowers the gooseneck to the ground and the trailer is ready for loading and unloading.

After the job is completed and the trailer is to be moved away, the above sequence of steps is simply reversed.

It is to be understood that while the preferred embodiment of the invention has been illustrated, numerous modifications and variations may be made without departing from the spirit and scope of the invention which is defined in the following claims.

We claim:

1. An industrial trailer including a load carrying bed; ground engaging wheels mounted at one end of the bed;
a selectively erectable or collapsible gooseneck including a hitch platform mounted at the other end of the bed;
first fluid means interposed between the hitch platform and the ground for lowering the bed to the ground;
separate fluid means independent of the first fluid means for selectively erecting or collapsing the gooseneck;
and a first link pivotally connected to the hitch platform and to the bed; a pair of second links pivotally connected to the hitch platform and to the bed forwardly of the first link; control means on the bed for controlling the first and second fluid means; and a self contained fluid power supply mounted on the bed operatively connected to the control means.

2. An industrial trailer having an elongate load carrying bed, a plurality of ground engaging wheels mounted at one end and a gooseneck mounted at the other end of the bed, the gooseneck including a first link pivotally connected to the bed and to a hitch platform;
a second link pivotally connected to the bed and to the hitch platform;
a ground engaging pad pivotally connected to the bed;
first fluid means interposed between the hitch platform and the pad for lowering the bed to the ground;
and second fluid means interposed between the first link and the bed for selectively raising or lowering the gooseneck independently of the first fluid means when the bed is on the ground.

3. Apparatus according to claim 2 wherein the first fluid means includes a pair of hydraulic cylinders interposed between the hitch platform and the ground.

4. Apparatus according to claim 2 wherein the second fluid means includes a pair of hydraulic cylinders interposed between the hitch platform and the bed;

and fluid control means whereby erection of the gooseneck by the cylinders locks the gooseneck in the towing mode.

5. An industrial trailer comprising:
a horizontal load carrying bed;
ground engaging wheels mounted at the rear of the bed;
a gooseneck mounted at the forward end of the bed;
the gooseneck including a first link pivotally connected at one end to the bed and pivotally connected at the other end to a hitch platform;
a second link pivotally connected to the bed and to the hitch platform forwardly of the first link;
a pair of ground engaging pads including forwardly extending pad links pivotally connected to the bed;
a fluid cylinder on each side of the trailer interposed between the pads and the hitch platform for lowering the bed to the ground;
a second cylinder independent of the bed lowering cylinders interposed between the first link and the bed for selectively erecting or lowering the gooseneck;
and cylinder control means mounted on the bed.

6. Apparatus according to claim 5 wherein the control means includes means for selectively pressurizing either of the bed lowering cylinders.

7. Apparatus according to claim 6 wherein the control means includes first valve means for directing fluid to the extend or retract side of the bed cylinders;
and further means for selectively extending either bed cylinder so as to adjust the bed relative to the ground.

8. Apparatus according to claim 7 wherein the first valve means includes a valve position for directing oil exhausted from the bed cylinders back to the extend side of one of the bed cylinders when the bed is adjusted relative to the ground.

* * * * *